United States Patent [19]

Madion

[11] Patent Number: 4,505,286
[45] Date of Patent: Mar. 19, 1985

[54] PORTABLE SHELTER

[76] Inventor: Herbert E. Madion, 41329 GlocaMora St., Mt. Clemens, Mich. 48045

[21] Appl. No.: 612,371

[22] Filed: May 21, 1984

[51] Int. Cl.³ .............................................. A45B 11/00
[52] U.S. Cl. ....................................... 135/90; 135/95; 135/104; 135/117; 135/901
[58] Field of Search ................. 135/90, 104, 900, 901, 135/95, 117, 102, 103

[56] References Cited

U.S. PATENT DOCUMENTS

| | | | |
|---|---|---|---|
| 1,169,702 | 1/1916 | Washburn | 135/90 |
| 3,605,771 | 9/1971 | Fox et al. | 135/102 |
| 3,690,334 | 9/1972 | Miller | 135/901 |
| 4,284,095 | 8/1981 | Norton | 135/901 |
| 4,343,322 | 8/1982 | Fiddler | 135/95 |
| 4,458,707 | 7/1984 | Lindaman | 135/90 |

*Primary Examiner*—Robert A. Hafer
*Assistant Examiner*—Daniel Nolan
*Attorney, Agent, or Firm*—Claude A. Patalidis

[57] ABSTRACT

A portable personal shelter formed of a sheet of water-repellant canvas or fabric having a semi-circular edge provided with a gusset through which is disposed a bowed flexible rod. The ends of the rod projecting from the gusset are provided with a ring to which is removably attached the end of a chordal member in the form of an elastic band provided at each end with a hook for attachment to a ring. A rope is attached to the center of the straight chordal edge of the sheet for attachment to a tree trunk or to a vertical post, with the chordal member engaged with the surface of the tree trunk or vertical post, thus forming a semi-conical roof for protecting a person from rain or snow. For easy transportation, the elastic band is doubled-up by passing through a ring and attaching both hooks to the same opposite rings such as to decrease the chordal length. While in the transportation mode, the shelter can be carried on the head of a person to provide protection against rain or snow while walking.

5 Claims, 10 Drawing Figures

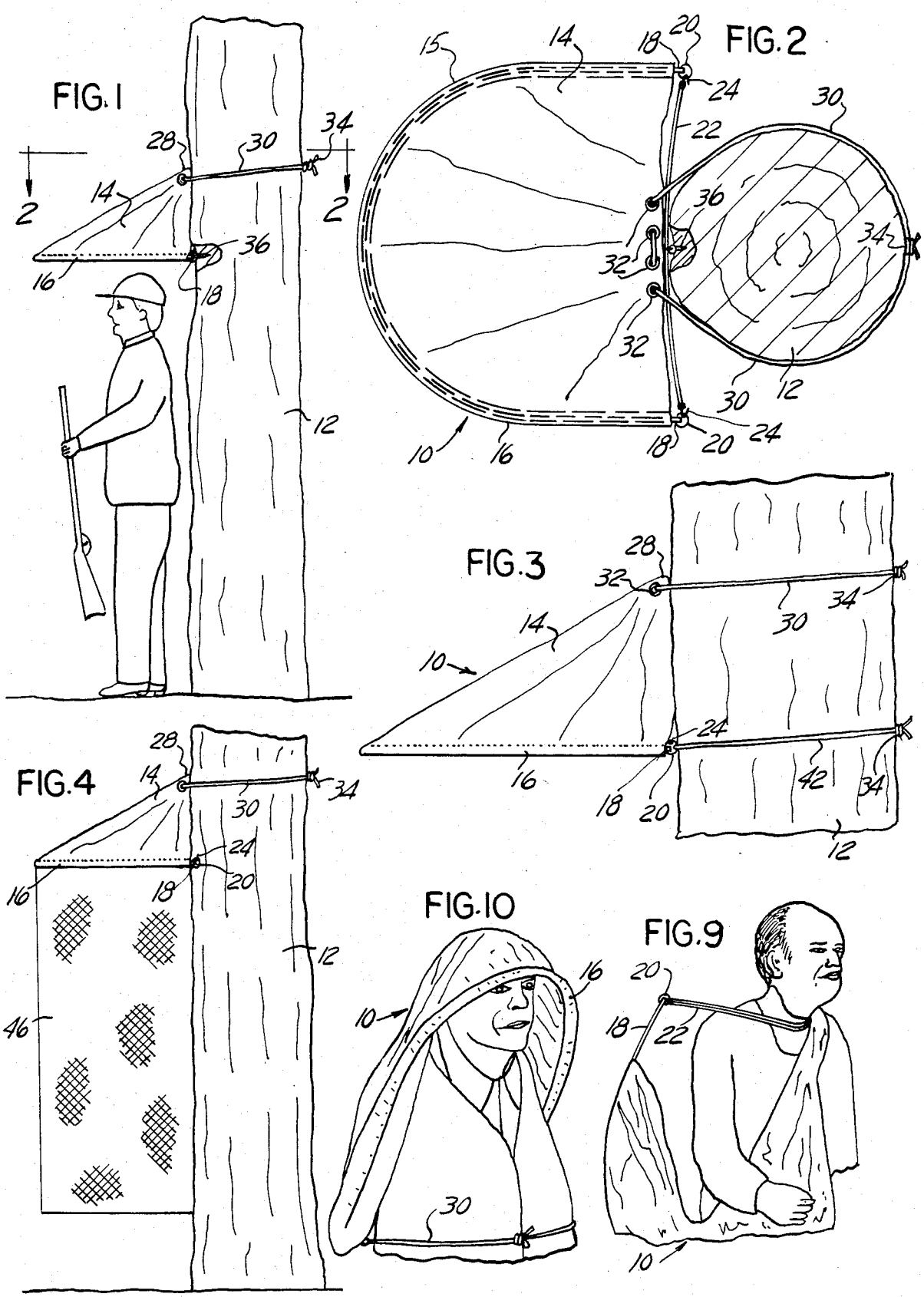

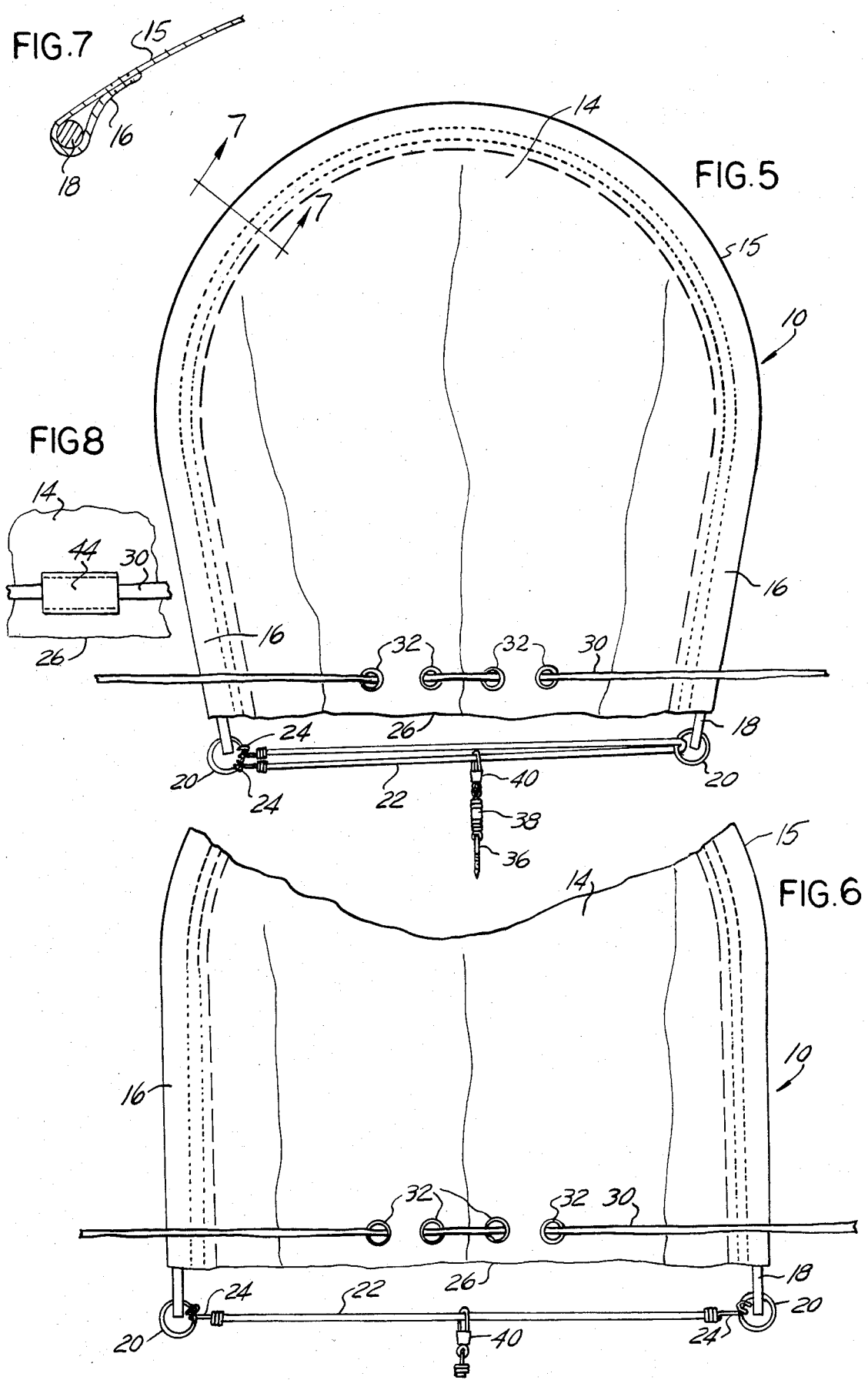

PORTABLE SHELTER

BACKGROUND OF THE INVENTION

The present invention relates to portable shelter in general, and more particularly to a portable shelter which may be attached to a tree trunk when in normal use during hunting or fishing.

While engaged in outdoor activities such as hunting, for example, there are many occasions when a person would desire to be in possession of a light portable individual shelter as protection against rain or snow, for instance, which can be easily carried and which can be rapidly erected in position when the need arises.

SUMMARY OF THE PRESENT INVENTION

The present invention provides a personal shelter for a person involved in outdoor activities, such as a hunter, which is light in weight, which is easy to carry, which provides protection against rain while being carried, if the need arises, and which can be simply attached to a tree for providing protection against inclement weather, more particularly rain or snow. The invention provides such a personal shelter, requiring no frame to stand erected, and which may be attached to a tree truck or to a wooden post.

The many objects and advantages of the present invention will become apparent to those skilled in the art when the following description of the best mode contemplated for practicing the invention is read in conjunction with the accompanying drawing, wherein like numerals refer to like or equivalent parts, and in which:

BRIEF DESCRIPTION OF THE DRAWING

FIG. 1 is a schematic representation of a portable personal shelter according to the present invention;

FIG. 2 is a top view thereof from line 2—2 of FIG. 1;

FIG. 3 is a partial view similar to FIG. 1, but showing a modification of the invention;

FIG. 4 is a view similar to FIG. 1, but showing the portable personal shelter of the invention provided with a netting skirt;

FIG. 5 is a top plan view thereof showing the portable personal shelter of the invention in its configuration adequate for carrying;

FIG. 6 is a view similar to FIG. 5 but showing the portable personal shelter in the configuration appropriate prior to attaching to a support member, such as a tree trunk;

FIG. 7 is a section along line 7—7 of FIG. 5;

FIG. 8 is a partial view thereof, showing a modification; and

FIGS. 9 and 10 are views illustrating two different manners of carrying the portable personal shelter of the invention.

DETAILED DESCRIPTION OF THE PREFERRED EMBODIMENTS

Referring now to the drawing and more particularly to FIGS. 1 and 2 thereof, the portable personal shelter 10 of the invention is illustrated attached to a tree trunk 12, for providing protection against rain or snow to, for example, a hunter in wait. The shelter 10 comprises a sheet 14 of pliable water-repellant, preferably fire-retardant, light fabric, provided at a semi-circular edge 15, as best shown at FIGS. 5-8 with a hem 16 forming a gusset through which is passed a flexible rod 18, which is thus held springingly bowed in the hem 16.

The flexible rod 18 may be metallic but, preferably, it is made of a single piece of flexible plastic such as plexiglas, for example, alike the very flexible material used for making fishing poles. The rod 18 is provided at each end with a transverse aperture through which is installed a closed ring 20. An elastic band 22, provided at each end with a hook 24, is attached to one of the rings 20 by means of a hook 24 and, during transportation, is attached to the same ring 24 by means of the other hook 24, the elastic band 22 being passed through the other ring 20, FIG. 5. Prior to attaching the personal shelter 10 to a tree trunk or wooden post, one of the hooks 24 is removed from one ring 20 and attached to the other ring 20, as shown at FIGS. 2 and 6, thus permitting the ends of the bowed rod 18 to elastically spread apart as much as the spring back tendency of the rod 18 and of the tension of the elastic band 22 allows.

The sheet 14 of canvas or fabric pliable material has, between the ends of the rod 18, at its edge 26, a width which is greater than the distance between the end of the rod 18 in the spread apart position illustrated at FIG. 6, such that it forms along the edge 26 a peak 28 where it is attached against the tree trunk 12 by means of a rope 30 threaded through a plurality of grommet-provided apertures 21 disposed proximate the edge 26. If the surface of the tree trunk 12 is sufficiently rough, the elastic band 22 is caused to engage the surface of the tree trunk and hold the shelter 10 in position against the tree trunk as illustrated at FIGS. 1 and 2, the rope 30, being wrapped around the tree trunk 12, and the two ends of the rope tied together by a knot 34. The rope 30 thus provides the only means for supporting the shelter 10. However, for better attachment, especially on occasions when the shelter 10 is attached to a tree trunk having a smooth surface, or to a wood post, a fastener such as, for example, a eye-screw 36 affixed by way of a swivel 38 to a ring or clip 40, through which the elastic band 22 is passed, permits to securely attach the elastic band 32 to a tree trunk 12 or wooden post by screwing the eye-screw 36 into the tree bark or into the wood post, FIGS. 1-2. Alternatively, a rope or string 42, FIG. 3, may be used for tying the elastic band 22 to a tree trunk 12 or a post, by wrapping the string or rope 42 around the tree trunk or the post, and tying the ends by means of a knot. Other means may also be used such as passing the string or rope 42 through the ring 20 on each end of the bowed rod 18.

As an alternate to lacing the rope 30 through eyelet-provided apertures 32, the rope 30 may be passed through a sewn-on gusset 44 attached proximate the rear edge 26 of the sheet 14 of canvas or fabric, as shown at FIG. 8. Also, insted of being made of single length of highly flexible material the rod 18 may be made of several shorter lengths fitted together by means of plugs and socket connectors.

By attaching a length of canvas or camoflage netting 46 around the periphery of the seam 16, a full length shelter or hunting blind is thus provided, FIG. 4. The length of canvas or camoflage netting 46 may be provided with appropriate slits, not shown. The means for attaching the length of canvas or camoflage netting 46 to the periphery of the hem 16 takes preferably the form of bands or strips of complementary loop and hoop material, such as sold under the trademark Velcro, strips or bands of either loop or hoop material being attached around the periphery of the hem 16 containing the rod 18, and the other bands or strips of complementary material being attached to the edge of the piece of canvas or camoflage netting 46.

The personal shelter 10, in its carrying mode, that is with the elastic band 22 doubled up as shown at FIG. 5, such as to prevent the ends of the bowed rod 18 spread too far apart, can conveniently carried over a person's shoulder, as shown at FIG. 9, or be placed over the person's head, as shown at FIG. 10 to provide a convenient mode of transportation combined with an ambulatory shelter against rain or snow, the rope 30 being wrapped around the person's body and attached at its ends by means of a knot.

Having thus described the present invention by way of an example of structure well designed to accomplish the objects of the invention, modifications whereof will be apparent to those skilled in the art, what is claimed as new is as follows:

I claim:

1. A portable personal shelter comprising a sheet of pliable material having a generally semi-circular edge and a linear chordal edge, a hem formed at the generally semi-circular edge, a bowed flexible rod disposed within said hem and having ends projecting from said hem at said substantially linear chordal edge, a chordal member means joining the projecting ends of said rod such as to pull said ends towards each other for forming a semi-conical configuration for said sheet of pliable material with an apex at said linear chordal edge, and means for attaching said apex to a tree trunk or vertical post with said chordal member engaged against said tree trunk or vertical post.

2. The portable personal shelter of claim 1 wherein said means for attaching said apex is a rope attached at said apex.

3. The portable shelter of claim 1 further comprising means for attaching said chordal member to said tree trunk or vertical pole.

4. The portable personal shelter of claim 3 wherein said means for attaching said chordal member to said tree trunk or vertical pole is a threaded member pivotally and swivelly attached to said chordal member.

5. The portable personal shelter of claim 1 wherein said chordal member is a pliable elastic band having a hook at each end, said hook being removably attached to a ring mounted at each end of said rod.

* * * * *

UNITED STATES PATENT AND TRADEMARK OFFICE
CERTIFICATE OF CORRECTION

PATENT NO. : 4,505,280
DATED : March 19, 1985
INVENTOR(S) : Herbert E. Maulon

It is certified that error appears in the above-identified patent and that said Letters Patent are hereby corrected as shown below:

Col. 2, line 9, change "24" to --20--.

Col. 2, line 22, after "peak 28" insert --FIGS. 1, 3, and 4,--.

Col. 2, line 25, change "21" to --32--.

Col. 2, line 39, change "32" to --22--.

Col. 2, line 52, correct the spelling of "instead".

Col. 2, line 57, change "seam" to --hem--.

Signed and Sealed this

Sixteenth Day of July 1985

[SEAL]

Attest:

DONALD J. QUIGG

Attesting Officer    Acting Commissioner of Patents and Trademarks